US006861102B2

(12) United States Patent
Wu et al.

(10) Patent No.: US 6,861,102 B2
(45) Date of Patent: Mar. 1, 2005

(54) ELASTOMERIC LUBRICANTS FOR MAGNETIC RECORDING MEDIA

(75) Inventors: Junhua Wu, San Jose, CA (US); Ga-Lane Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/653,900

(22) Filed: Sep. 4, 2003

(65) Prior Publication Data

US 2004/0048053 A1 Mar. 11, 2004

Related U.S. Application Data

(62) Division of application No. 09/559,096, filed on Apr. 27, 2000, now Pat. No. 6,617,011.
(60) Provisional application No. 60/133,216, filed on May 7, 1999.

(51) Int. Cl.⁷ .................................................. C08J 7/18
(52) U.S. Cl. ........................ 427/490; 427/502; 427/508
(58) Field of Search ............................... 427/490, 502, 427/508

(56) References Cited

U.S. PATENT DOCUMENTS

| 3,025,279 A | 3/1962 | Barr |
| 3,104,983 A | 9/1963 | Tarwater et al. |
| 3,810,874 A | 5/1974 | Mitsch et al. |
| 3,814,741 A | 6/1974 | Caporiccio et al. |
| 4,132,681 A | 1/1979 | Field et al. |
| 4,404,247 A | 9/1983 | Dominguex-Burguette et al. |
| 4,446,193 A | 5/1984 | Afzali-Ardakani et al. |
| 4,486,500 A | 12/1984 | Naruo et al. |
| 4,526,833 A | 7/1985 | Burguette et al. |
| 4,543,275 A | 9/1985 | Akashi et al. |
| 4,569,962 A | 2/1986 | Burguette et al. |

(List continued on next page.)

OTHER PUBLICATIONS

Lee et al., May 1993, "Enhanced Tribological Performance of Rigid Disk by Using Chemically Bonded Lubricant", J. Vac. Sci. Technol. A, vol. 11(3), pp. 711–714.
Tian et al., Jul. 1993, "Tribological Characteristics of Liquid Lubricant on Magnetic Disks Treated by Far–UV Radiation" J. Tribology, vol. 115, pp. 400–405.
Vurens et al., Jan. 1993 "The Mechanism of Ultraviolet Bonding of Perfluoropolyether Lubricants" IEEE Transactions on Magnetics, vol. 29, pp. 282–285.

*Primary Examiner*—Stevan Resan
(74) *Attorney, Agent, or Firm*—McDermott Will & Emery LLP

(57) ABSTRACT

Elastomeric fluoropolyether lubricant topcoats are formed on a protective overcoat of a magnetic recording medium. Embodiments include forming a an amorphous carbon layer having a thickness of no greater than about 25 Å as the protective overcoat and polymerizing a fluorpolyether having one or more acrylate groups on the amorphous carbon layer to form the elastomeric fluoropolyether topcoat lubricant directly on the protective overcoat.

8 Claims, 3 Drawing Sheets

U.S. PATENT DOCUMENTS

| | | |
|---|---|---|
| 4,588,656 A | 5/1986 | Kiamoto et al. |
| 4,642,246 A | 2/1987 | Janssen et al. |
| 4,645,703 A | 2/1987 | Suzuki et al. |
| 4,671,999 A | 6/1987 | Burguette et al. |
| 4,681,925 A | 7/1987 | Strepparola et al. |
| 4,686,146 A | 8/1987 | Karle et al. |
| 4,699,835 A | 10/1987 | Takeuchi et al. |
| 4,701,375 A | 10/1987 | Nishimatsu et al. |
| 4,705,699 A | 11/1987 | Burguette et al. |
| 4,721,640 A | 1/1988 | Kato et al. |
| 4,758,471 A | 7/1988 | Arioka et al. |
| 4,828,899 A | 5/1989 | Arioka et al. |
| 4,835,032 A | 5/1989 | Arioka et al. |
| 4,849,291 A | 7/1989 | Yacobucci et al. |
| 4,880,687 A | 11/1989 | Yokoyama et al. |
| 4,960,609 A | 10/1990 | Homola et al. |
| 4,992,316 A | 2/1991 | Ogawa |
| 5,030,478 A | 7/1991 | Lin et al. |
| 5,049,410 A | 9/1991 | Johary et al. |
| 5,055,359 A | 10/1991 | Tsuno et al. |
| 5,080,982 A | 1/1992 | Yamamoto et al. |
| 5,118,525 A | 6/1992 | Chino et al. |
| 5,143,787 A | 9/1992 | Frew et al. |
| 5,178,954 A | 1/1993 | Norman et al. |
| 5,188,747 A | 2/1993 | Kai et al. |
| 5,232,791 A | 8/1993 | Kohler et al. |
| 5,266,724 A | 11/1993 | Kai et al. |
| 5,279,877 A | 1/1994 | Uchiyama et al. |
| 5,331,487 A | 7/1994 | Gregory et al. |
| 5,409,738 A | 4/1995 | Matsunuma et al. |
| 5,432,039 A | 7/1995 | Shimokawa et al. |
| 5,534,322 A | 7/1996 | Ueyama et al. |
| 5,543,203 A | 8/1996 | Tani et al. |
| 5,545,478 A | 8/1996 | Lin et al. |
| 5,591,481 A | 1/1997 | Takahasi et al. |
| 5,618,617 A | 4/1997 | Uchida et al. |
| 5,631,041 A | 5/1997 | Kanzizuka et al. |
| 5,631,081 A | 5/1997 | Lin et al. |
| 5,661,618 A | 8/1997 | Brown et al. |
| 5,783,320 A | 7/1998 | Shimazaki et al. |
| 5,858,477 A | 1/1999 | Veerasamy et al. |
| 5,858,536 A | 1/1999 | Yanagisawa |
| 5,874,169 A | 2/1999 | Falcone |
| 5,912,061 A | 6/1999 | Uchida et al. |
| 5,919,560 A | 7/1999 | Nishimori |
| 6,071,609 A | 6/2000 | Furutani et al. |
| 6,096,385 A | 8/2000 | Yong et al. |
| 6,096,694 A | 8/2000 | Tei et al. |
| 6,099,762 A | 8/2000 | Lewis |
| 6,110,584 A | 8/2000 | Hiratsuka et al. |
| 6,150,001 A | 11/2000 | Hedrick et al. |
| 6,238,780 B1 | 5/2001 | Wu et al. |

ELASTOMERIC LUBRICANTS FOR MAGNETIC RECORDING MEDIA

CROSS-REFERENCE TO RELATED APPLICATION

This application is a divisional of application Ser. No. 09/559,096 filed Apr. 27, 2000, now U.S. Pat. No. 6,617,011, which claims priority from Provisional Application Ser. No. 60/133,216, filed May 7, 1999.

FIELD OF THE INVENTION

The present invention relates to magnetic recording media, such as thin film magnetic disks, having a polymerized lubricant topcoat thereon. The present invention has particular applicability in manufacturing magnetic recording media suitable for high density recording and long term magnetic performance stability.

BACKGROUND OF THE INVENTION

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up, flying and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques include laser texturing the surface of a non-magnetic substrate to provide a textured landing zone in which a magnetic head can land when the drive is not in use, and can take off when the drive is reading and writing data. Typically, the surface of the non-magnetic substrate is polished to a specular finish prior to a laser texturing process to form a landing zone leaving a substantially smooth data zone. Subsequently, an underlayer, a magnetic layer, a protective overcoat and a lubricant topcoat are sequentially deposited, wherein the textured surface on the substrate is intended to be substantially replicated in the subsequently deposited layers. Typical substrate materials include an aluminum alloy with a layer of amorphous nickel phosphorous thereon, glasses, ceramics and glass-ceramic materials, as well as graphite. Underlayers typically comprise chromium or a chromium alloy, while the magnetic layer typically comprises a cobalt based alloy. Protective overcoats typically contain carbon. Such layers are typically deposited by sputtering techniques preformed in an apparatus containing sequential deposition chambers.

The application of the protective layer and the topical lubricant are essential for high durability and reliability of thin film recording media. In accordance with conventional practices, a lubricant topcoat is applied over the protective layer to prevent wear between the disk and head interface during drive operation.

Fluoropolyether lubricants are of particular interest in lubricating magnetic recording media. These lubricants are uniquely suited to form lubricant topcoats on magnetic media because of such properties as chemical inertness, low vapor pressure, low surface tension, high thermal stability, stability under high shear stress and good boundary lubrication properties. Among the many lubricants available, liquid perfluoropolyethers (PFPE) are the most typically used in forming topcoat lubricants on magnetic recording media.

Liquid lubrication of the disk surface encounters several problems, however, which limit its effectiveness as used in rotating storage media. For example, it is well known that non-bonded lubricants will spin off a thin film disk with a carbon overcoat. Typically, PFPE lubricants do not have a retention means so that when the disk rotates, the lubricant tends to spins off the disk. The depletion of the lubricant from the disk surface increases the friction between the disk and the read/write head.

Further, the depletion of the lubricant results in non-uniformity across the surface of the disk resulting in additional operational difficulties. For example, where the thickness is too thin, the head can cause wear on the disk surface and where the lubricant thickness is too great, the head will become stuck in the lubricant (from static friction) and the head or disk could be damaged when the head suddenly becomes unstuck due to the rotating disk.

Burguette et al. in U.S. Pat. No. 4,404,247 disclose anchoring a polymerizable composition directly to a metallized substrate by a complex system which includes an inner polymeric film and an outer polymeric film. The inner polymer is made from a film forming aromatic or heterocyclic polymerizable monomer and a vinyl aromatic polymer and the outer polymer contains a compound having a perfluoropolyether segment. Burguette et al disclose that such a system would adequately protect a metallic thin film and teach away from the use of a hard protective coating on magnetic thin film media. Several other patents to Burguette et al., such as U.S. Pat. Nos. 4,526,833; 4,569,962; 4,671,999; and 4,705,699, disclose additional ingredients in creating the complex two phase polymer coating system.

Accordingly, a continuing need exists in the art for an improved lubricated magnetic recording medium. In particular there exists a need for an efficient, cost-effective method of manufacturing a magnetic recording medium with a lubricant topcoat exhibiting improved tribological performance and fly-stiction.

SUMMARY OF THE INVENTION

An advantage of the present invention is an efficient cost-effective method of manufacturing a magnetic recording medium having a lubricant topcoat optimized for tribological performance with reduced fly-stiction.

An additional advantage of the present invention is a magnetic recording medium having an elastomeric lubricant topcoat thereon with improved tribological performance.

Additional advantages and other features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other aspects are achieved in part by a method of manufacturing a magnetic recording medium with an elastomeric topcoat lubricant. The method comprises forming a protective overcoat on a magnetic layer; applying a fluoropolyether having at least one polymerizable group thereon to the protective overcoat; and polymerizing the fluoropolyether to form an elastomeric topcoat lubricant directly on the protective overcoat.

In embodiments of the present invention, the fluoropolyether, e.g. a perfluoropolyalkylether having more than one acrylate groups, can be polymerized to a crosslinked elastomeric fluoropolyether directly on the protective overcoat with improved tribology. In accordance with embodiments of the present invention, a protective overcoat, e.g. a carbon containing overcoat, can be formed to a thickness of no greater than about 50 Å, e.g. no greater than about 25 Å, with the elastomeric fluoropolyether lubricant topcoat directly on the protective overcoat. The elastomeric topcoat of the present invention advantageously permits a thinner protective overcoat thereby minimizing the fly height of the transducer head over the magnetic recording medium consistent with the demands for higher areal recording density.

Another aspect of the present invention is a magnetic recording medium comprising a protective overcoat and an elastomeric fluoropolyether topcoat directly on the protective overcoat. In an embodiment of the present invention, the magnetic recording medium comprises a substrate; a magnetic layer on the substrate; the protective overcoat on the magnetic layer, e.g. an amorphous carbon layer having a thickness of no greater than about 25 Å; and the elastomeric fluoropolyether topcoat lubricant directly on the protective overcoat.

The inventive magnetic recording medium advantageously comprises a protective overcoat and an elastomeric fluoropolyether topcoat with improved tribological performance at a combined thickness of no greater than about 60 Å. The advantageously thin protective overcoat and lubricant topcoat minimizes the distance between the magnetic layer and the transducer head improving signal and recording performance of the inventive magnetic media when incorporated in a magnetic recording device.

Additional advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
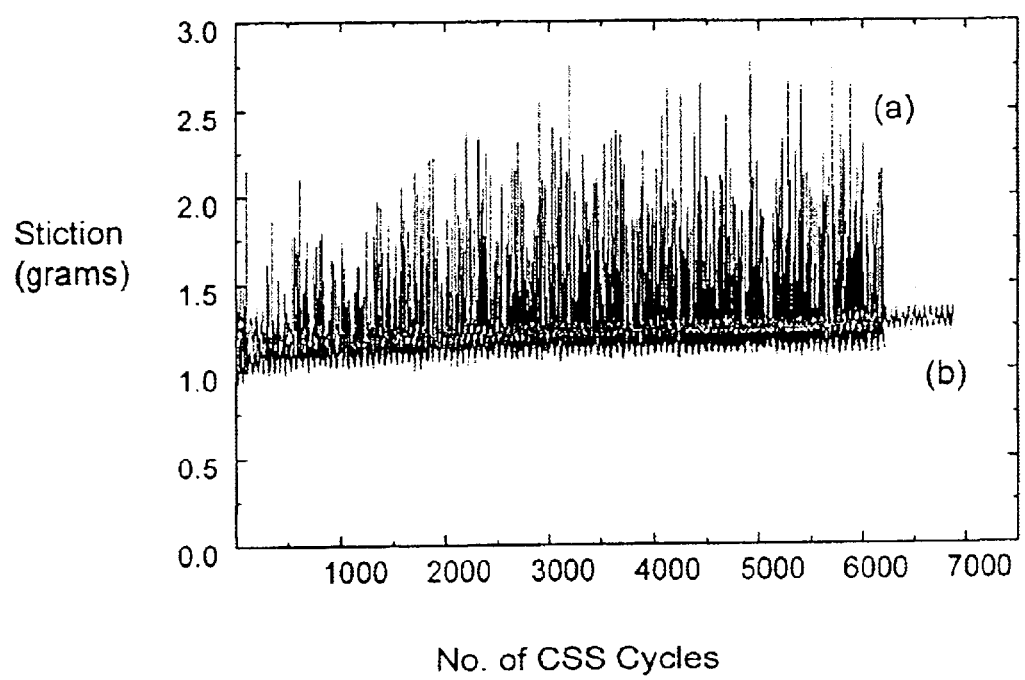
FIG. 1 graphically illustrates comparative results of CSS testing of a conventionally lubricated magnetic recording disk to a magnetic recording disk having an elastomeric lubricant topcoat according to the present invention.

Surprisingly, it was found, through experimentation and investigation, that the combined thickness of an elastomeric topcoat lubricant on a protective overcoat of a magnetic recording medium can be minimized to an optimal thickness with excellent lubricity and wear resistance. The reduced thickness of the lubricating and protective layer minimizes the distance between the transducer head and the magnetic layer of a recording device thereby improving signal and device performance. The present invention provides an improved, efficient and cost effective method of optimizing tribological performance of a magnetic recording medium.

In accordance with the present invention, a lubricant topcoat is formed on a protective overcoat of a magnetic recording medium. The magnetic recording medium of the present invention comprises a composite of a magnetic layer on a non-magnetic substrate. In an embodiment of the present invention, an underlayer such as chromium or a chromium alloy is formed between the non-magnetic substrate and the magnetic layer.

In practicing the present invention, the protective overcoat comprises one or more layers of carbon, e.g. hydrogenated amorphous carbon or nitrogenated amorphous carbon. Hydrogenated amorphous carbon, for example, is hydrogen doped amorphous carbon, while nitrogenated amorphous carbon is nitrogen doped amorphous carbon. Other thin film materials that serve as a protective overcoat in accordance with embodiments of the present invention include silicon nitride. Embodiments of the present invention also includes dual or multiple layers serving as the protective overcoat as, for example, a bilayer of silicon nitride capped with hydrogenated carbon. The protective overcoat is formed on the magnetic medium by conventional techniques as, for example, by sputter-depositing an amorphous hydrogenated carbon film employing a plasma deposition chamber. A more complete description of forming a protective overcoat can be found, for example, in U.S. Pat. No. 5,945,191 to Hwang et al.

Typical non-magnetic substrate materials include an aluminum alloy with a layer of amorphous nickel-phosphorous thereon, such as an aluminum-magnesium alloy with a nickel-phosphorous surface coating. Other substrate materials include glasses, ceramics and glass-ceramic materials, as well as graphite. A magnetic recording layer of the present invention includes typical magnetic recording layers as, for example, a cobalt based alloy layer, such as one or more layers comprising one or more of chromium, platinum, tantalum, niobium, tungsten with cobalt. Other magnetic layer materials contemplated by the present invention include a barium ferrite film and perpendicular recording media. The magnetic layer or layers and underlayer are deposited on the non-magnetic substrate by conventional deposition techniques, as by sputtering techniques preformed in an apparatus containing sequential deposition chambers.

In accordance with the present invention, the protective overcoat and the elastomeric lubricant topcoat are formed on the magnetic layer of the magnetic recording medium to a minimum thickness. Advantageously, the protective overcoat and elastomeric lubricant topcoat of the present invention can be formed as thin as necessary for protecting and lubricating the magnetic medium, as for example, a protective overcoat of less than about 10 Å. Embodiments include forming the protective overcoat to a thickness of no greater than approximately 25 Å, and forming the elastomeric lubricant topcoat directly on the protective overcoat to a thickness of approximately 5 Å to about 30 Å.

The protective and lubricant layers of the present invention provide lubricity and wear resistance at a minimum thickness thereby reducing the distance between the magnetic layer and the transducer head of a recording device. In an embodiment of the present invention, the protective overcoat and the elastomeric lubricant topcoat are sequentially formed over the magnetic layer having a combined thickness of no greater than about 60 Å, e.g. a combined thickness of no greater than about 30 Å.

In practicing the present invention, an elastomeric lubricant topcoat is formed on the protective overcoat by applying a fluoropolyether having at least one polymerizable group thereon to the protective overcoat and polymerizing the fluoropolyether to form an elastomeric topcoat lubricant directly on the protective overcoat. Fluoropolyether lubricants of the present invention include compounds having the formula:

A-Rf-B wherein Rf is a fluoropolyether; and A is an alkyl group, alkoxy group, a polymerizable group, or a fluorinated derivative thereof, and B is a polymerizable group. In an embodiment of the present invention, both A and B represent polymerizable groups, e.g., both A and B are acrylates. Polymerization of such a polyfunctional fluoropolyether results in a crosslinked elastomeric lubricant topcoat on the protective overcoat.

Polymerizable groups according to the present invention include those moieties that can repeatedly undergo chemical unions with themselves as, for example, vinyl groups, such as alkenes, alkynes, acrylates, acrylamides, epoxy groups, carboxyl groups, etc. Polymerizable groups of the present invention also comprise those moieties that chemically join with a complementary moiety as, for example, carboxylic acids and alcohols, carboxylic acids and amines, anhydrides and amines, isocyanates and amines, alcohols and/or acids, etc. Accordingly, the present invention contemplates addition polymerization, condensation polymerization and/or ring-opening polymerization process in polymerizing the applied fluoropolyether lubricant to form the elastomeric topcoat lubricant on the magnetic media.

Fluoropolyethers of the present invention include homopolymers, random polymers or block polymers, i.e. the repeating units of the fluoropolyether, Rf, may be the same or different. In addition, different repeat units of Rf can be randomly distributed along the backbone of the polymer or distributed as a block of one type of repeat unit and subsequent blocks of different repeat units along the backbone of the polymer. The inventive lubricants can be completely fluorinated or partially fluorinated and can be linear or branched. In an embodiment of the present invention, Rf is a perfluoropolyalkylether comprising a plurality of $-(C_aF_{2a}O)_n-$ repeating units, wherein subscript a is independently in each such unit an integer of from 1 to about 10 and n is an integer from 2 to about 100. In an embodiment of the present invention n is an integer from about 5 to about 80, e.g. from about 10 to about 60.

Fluoropolyether lubricants having at least one polymerizable group are commercially available or can be prepared by conventional synthetic chemistry. Representative fluoropolyalkylethers of the foregoing have the structures shown in the Table

TABLE[1]

| | |
|---|---|
| 1 | $H_2C=CHCOCX_2CX_2O(CF_2O)_m(CF_2CF_2O)_nCX_2CX_2OCCH=CH_2$ (with C=O groups) |
| 2 | $H_2C=CHCNHCX_2CX_2O(CF_2O)_m(CF_2CF_2O)_nCX_2CX_2NHCCH=CH_2$ (with C=O groups) |
| 3 | $F(CF_2CF_2CF_2O)_nCX_2CX_2OC(O)CH=CH_2$ |
| 4 | $F(CF_2CF_2CF_2O)_nCX_2CX_2NHC(O)CH=CH_2$ |
| 5 | $CF_3O(CF_2CF(CF_3)O)_nCX_2CX_2OC(O)CH=CH_2$ |

[1] wherein each of n and m are 1 to about 200 and X is hydrogen or fluorine.

The fluoropolyalkylethers derivatives of the above are commercially available and can be prepared as described in the U.S. Pat. Nos. 4,681,925 and 3,814,741.

In an embodiment of the present invention, the fluoropolyether lubricants have a number average molecular weight of about 500 to about 20000 a.m.u., e.g., about 1000 to about 2500 a.m.u. In practicing the present invention, the fluorpolyether lubricants can be applied to a protective overcoat of a magnetic recording medium in any convenient manner, as by dip coating the medium in a solution of the lubricant in a conventional organic solvent or by applying a solution of the lubricant over the medium. Conventional spray, wipe and vapor coating techniques for applying the lubricants are also contemplated by the present invention.

In an embodiment of the present invention, the lubricant is dissolved in a conventional solvent, such as Freon, Vertrel XF or perfluorohexane (solvents available from Dupont), in a ratio of about 0.0001% to about 100% by (weight/weight), e.g. about 0.001% to about 1%. A typical magnetic recording medium, for example, a composite comprising a non-magnetic substrate having sequentially deposited on each side thereof an underlayer, a magnetic layer, and a protective carbon overcoat, is submerged in the lubricant solution and then slowly withdrawn therefrom. In practicing the present invention, one can employ a conventional lifter-type dipper to submerge the composite in the lubricant solution. One having ordinary skill in the art can easily optimize the duration of submergence and the speed of withdrawal to achieve a desired coating thickness.

After application of the fluoropolyether lubricant having at least one polymerizable group, the fluoropolyether is then polymerized and/or crosslinked in accordance with the type of polymerizable moiety on the fluoropolyether. For example, polymerization can be carried out by the application of heat for condensation polymerizable groups, or by the use of conventional radiation, a catalyst system or heat for addition polymerizable groups. The resulting polymers are elastomeric and exhibit flexibility and excellent wear resistance as elastomeric lubricant topcoats.

In an embodiment of the present invention, a fluoropolyethers having at least one vinyl moiety is advantageously polymerized directly on the surface of a protective overcoat of a magnetic recording medium. The fluoropolyether can be polymerized according to photochemical methods, such as ultraviolet (UV) radiation, or by bombardment with an high-energy electron beam. For example, UV radiation can be used to effect polymerization of the fluoropolyether lubricant in an inert atmosphere with or without the use of a photoinitiator. Although the rate of polymerization is enhanced by photoinitiators or sensitizers, adequate polymerization of the lubricant can be attained without their use.

Further, ultraviolet radiation is particularly effective and economical for crosslinking fluoropolyether lubricants with more than one vinyl groups, e.g., multiple acrylate groups. It is possible to vary the molecular weights of the starting fluoropolyether and the number of vinyl groups to regulate the degree of crosslinking when a fluoropolyether having multiple polymerizable groups is employed to form the elastomeric topcoat lubricant.

In an embodiment of the present invention, the lubricated magnetic recording medium is exposed to UV radiation from a low pressure mercury lamp UV lamp which emits radiation over the range of about 254 nm to about 185 nm. In an embodiment of the present invention, the lubricated disk is exposed to UV radiation having an intensity of about several to about 100 or more milliwatts/cm$^2$ for an exposure duration of approximately 5 seconds to about 10 minutes to form a polymerized elastomeric fluorpolyether lubricant topcoat.

EXAMPLES

Perfluoroalkylpolyether diacrylate lubricants having the formula:

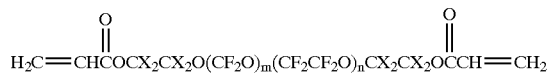

wherein m is about 1 to about 50; n is about 1 to about 50 and X represents either hydrogen or fluorine were obtained from 3M (located in St. Paul, Minn.). The diacrylate lubricant were dissolved in PF5060 solvent (available from 3M) at about 0.01% to about 1% by weight to form solutions of the lubricant in the solvent. The lubricant solutions were applied to amorphous carbon protective layers of magnetic recording media by using a dip-coat technique, i.e. by dipping the media in the solution and slowly withdrawing the media from the solution to yield a lubricated amorphous carbon layer.

In the present experiment, thin film magnetic media having an amorphous carbon protective overcoat were used. The carbon protective overcoats were formed by conventionally sputtering techniques performed in an apparatus (available from Intevac of Santa Clara, Calif.) containing sequential deposition chambers, to form the amorphous carbon overcoats having a thickness of about 10 Å to about 40 Å on the magnetic layer of rigid disks. The lubricant solutions were then applied directly to the amorphous carbon overcoats.

The thickness of the lubricant on the media was controlled by varying the rate of withdrawal and/or solution concentration to yield thicknesses in the range of about 10 Å to about 30 Å. The thicknesses were measured by FTIR (Fourier Transform Infrared Spectroscopy), calibrated by x-ray reflectometry and ESCA (Electronic Spectroscopy for Chemical Analysis), which has an error on the order of about 1 Å.

The applied diacrylate lubricants were then polymerized to a crosslinked elastomeric lubricant topcoat directly on the amorphous carbon overcoat to form a combined thickness of the lubricant layer together with the carbon layer of about 10 Å to about 40 Å. The polymerization conditions were as follows: the lubricated disks were exposed to a UV lamp with an intensity of about 5 milliwatts/cm$^2$ in a UV chamber for about 90 seconds.

Figure 2:
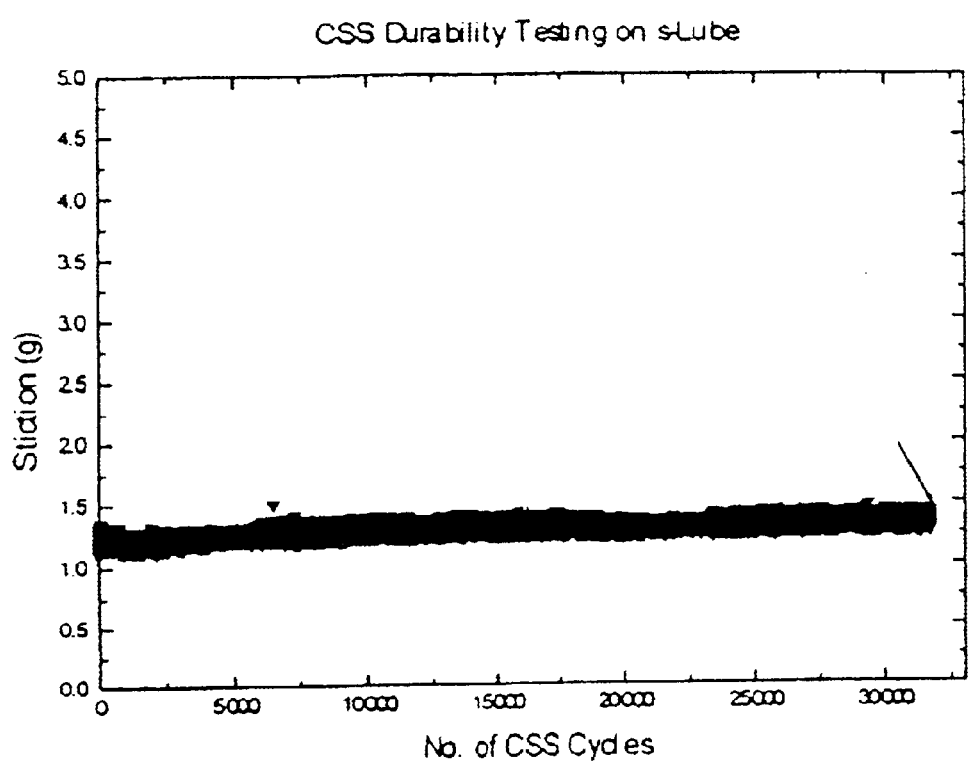
FIG. 2 shows CSS durability results for a magnetic recording medium having an elastomeric lubricant topcoat according to the present invention.
Figure 3:
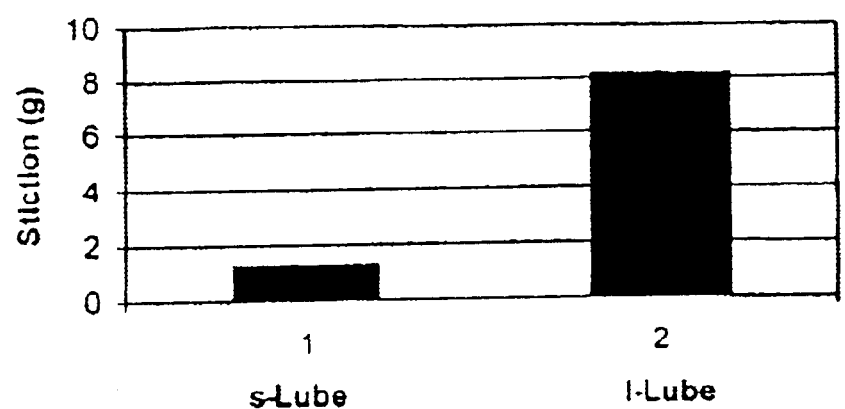
FIG. 3 shows the stiction superiority of a magnetic recording disk having an elastomeric lubricant topcoat according to the present invention.

The superior tribological performance of magnetic recording media prepared by the present invention compared to conventionally prepared magnetic recording media is shown in FIGS. 1–3. In the comparison, a rigid magnetic recording disk having a 93 Å bumped height landing zone was provided. In accordance with the present example, an approximately 25 Å thick amorphous carbon protective overcoat was deposited on a magnetic layer and the crosslinked elastomeric topcoat was formed at a thickness of about 26 Å on the amorphous carbon layer. The conventional magnetic recording disk was prepared by depositing a 50 Å amorphous carbon layer onto a magnetic layer and then depositing a 23 Å thick conventional high molecular weight Z-DOL lubricant on the amorphous carbon layer.

FIG. 1 illustrates the comparative initial stiction for the two disks. As shown, by the line identified with the symbol (a), the conventionally prepared disks typically have an observed stiction value of greater than 2.5 grams. In contrast, the disks prepared by the present invention have a stiction value (shown as line (b)) of no greater than approximately 1.5 grams, e.g., no greater than about 1.25 grams, even though the thickness of the lubricant layer and carbon layer for the inventive disk are less than a conventionally prepared disk.

The superior tribological performance is further evident by the high durability observed for the disks prepared by the present invention. As the results demonstrate in FIG. 2, the inventive disks have been prepared having a stiction value that does not exceed about 1.5 grams for over 30,000 Contact-Start-Stop cycles. FIG. 3 graphically displays the superior parking stiction of less than about 1.75 grams of the inventive disk (s-Lube) compared to the conventional disk (l-Lube). The observed results for the magnetic recording media prepared according to the present invention demonstrate superior tribology while minimizing the thickness of the lubricant topcoat and protective overcoat.

The present invention is not limited to any particular type of magnetic recording medium, but can be employed in any of various magnetic recording media, including those wherein the substrate or a subsequently deposited base layer has been textured, as by mechanical treatment or by laser techniques, and the textured surface substantially reproduced on subsequently deposited layers. Thus, a lubricant prepared in accordance with the present invention, can be applied to form an elastomeric lubricant topcoat, such as a crosslinked elastomeric topcoat directly on the surface of a protective overcoat of a magnetic recording medium, but is not necessarily limited thereto.

Only the preferred embodiment of the present invention and an example of its versatility is shown and described in the present disclosure. It is to be understood that the present invention is capable of use in various other combinations and environments and is capable of changes or modifications within the scope of the inventive concept as expressed herein.

What is claimed is:

1. A method of manufacturing a magnetic recording medium, the method comprising:
    forming a amorphous carbon protective overcoat having a thickness of no greater than about 25 Å over a magnetic recording layer;
    applying a fluoropolyether having at least one polymerizable group thereon to the protective overcoat; and
    polymerizing the fluoropolyether to form an elastomeric topcoat lubricant directly on the protective overcoat, wherein said protective overcoat and said elastomeric topcoat lubricant have a combined thickness of no greater than 60 Å.

2. The method according to claim 1, comprising polymerizing the fluoropolyether to a crosslinked elastomeric fluoropolyether directly on the protective overcoat.

3. The method according to claim 1, comprising applying the fluoropolyether to a thickness of about 10 Å to about 30 Å.

4. The method according to claim 1, wherein lubricant is a perfluoropolyalkylether having one or more acrylate groups.

5. The method according to claim 4, wherein the fluoropolyether comprises a plurality of —$(C_aF_{2a}O)_n$— repeating units, wherein subscript a is independently in each such unit an integer of from 1 to about 10 and n is an integer from 5 to about 80.

6. The method according to claim 1, wherein the fluoropolyether comprises a compound having the formula:

$$CH_2=CH(O)COCH_2CF_2O(CF_2CF_2O)_n(CF_2O)_mCF_2CF_2OC(O)CH=CH_2$$

wherein each of n and m is 1 to about 200.

7. The method according to claim 1, comprising polymerizing the fluoropolyether by exposure to UV radiation.

8. The method according to claim 1, wherein said elastomeric topcoat lubricant comprises the polymerization product of a fluoropolyether having at least two polymerizable acyrlate groups through which polymerization occurs.

* * * * *